United States Patent
Karabchevsky et al.

(10) Patent No.: US 10,397,262 B2
(45) Date of Patent: Aug. 27, 2019

(54) DEVICE, SYSTEM, AND METHOD OF DETECTING OVERLAY MALWARE

(71) Applicant: BioCatch Ltd., Tel Aviv (IL)

(72) Inventors: Leonid Karabchevsky, Shimshit (IL); Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 218 days.

(21) Appl. No.: 15/654,731

(22) Filed: Jul. 20, 2017

(65) Prior Publication Data
US 2019/0028497 A1 Jan. 24, 2019

(51) Int. Cl.
*H04L 29/06* (2006.01)
*G06F 3/041* (2006.01)
*G06F 21/55* (2013.01)
*H04W 12/12* (2009.01)
*G06F 21/56* (2013.01)
*G06F 3/0488* (2013.01)

(52) U.S. Cl.
CPC ........ *H04L 63/1425* (2013.01); *G06F 3/0416* (2013.01); *G06F 21/554* (2013.01); *G06F 21/566* (2013.01); *H04L 63/145* (2013.01); *H04L 63/1483* (2013.01); *H04W 12/12* (2013.01); *G06F 3/0488* (2013.01); *G06F 2221/032* (2013.01)

(58) Field of Classification Search
CPC ............... H04L 63/1425; H04L 63/145; H04L 63/1483; G06F 3/0416; G06F 21/554; G06F 21/566; G06F 3/0488; G06F 2221/032; H04W 12/12
See application file for complete search history.

(56) References Cited

U.S. PATENT DOCUMENTS

| 3,618,019 A | 11/1971 | Nemirovsky et al. |
| 3,699,517 A | 10/1972 | Dyche |
| 3,983,535 A | 9/1976 | Herbst et al. |

(Continued)

FOREIGN PATENT DOCUMENTS

| EP | 2410450 | 1/2012 |
| EP | 2477136 | 7/2012 |

(Continued)

OTHER PUBLICATIONS

Faisal Alkhateeb et al., "Bank Web Sites Phishing Detection and Notification System Based on Semantic Web technologies", International Journal of Security and its Applications 6(4):53-66, Oct. 2012.

(Continued)

*Primary Examiner* — Sarah Su
(74) *Attorney, Agent, or Firm* — Eitan Mehulal Sadot

(57) ABSTRACT

Devices, systems, and methods to detect malware, particularly an overlay malware that generates a fake, always-on-top, masking layer or an overlay component that attempts to steal passwords or other user credentials. A defensive module protects a victim application, particularly of an electronic device having a touch-screen. The defensive module generates a transparent or invisible always-on-top layer of its own; and periodically injects automatically-generated non-human tap events or touch-gesture events, and checks whether the injected events are indeed received, in order to determine whether an overlay malware is active.

20 Claims, 1 Drawing Sheet

(56) References Cited

U.S. PATENT DOCUMENTS

| | | |
|---|---|---|
| 4,128,829 A | 12/1978 | Herbst et al. |
| 4,621,334 A | 11/1986 | Garcia |
| 4,760,386 A | 7/1988 | Heath |
| 4,805,222 A | 2/1989 | Young et al. |
| 5,442,342 A | 8/1995 | Kung |
| 5,485,171 A | 1/1996 | Copper et al. |
| 5,557,686 A | 9/1996 | Brown et al. |
| 5,565,657 A | 10/1996 | Merz |
| 5,838,306 A | 11/1998 | O'Connor et al. |
| 5,874,941 A | 2/1999 | Yamada |
| 5,999,162 A | 12/1999 | Takahashi |
| 6,337,686 B2 | 1/2002 | Wong et al. |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,938,061 B1 | 8/2005 | Rumynin et al. |
| 6,938,159 B1 | 8/2005 | O'Connor et al. |
| 6,957,185 B1 | 10/2005 | Labaton |
| 6,957,186 B1 | 10/2005 | Guheen et al. |
| 6,983,061 B2 | 1/2006 | Ikegami et al. |
| 7,092,926 B2 | 8/2006 | Cerrato |
| 7,130,452 B2 | 10/2006 | Bolle et al. |
| 7,133,792 B2 | 11/2006 | Murakami et al. |
| 7,139,916 B2 | 11/2006 | Billingsley et al. |
| 7,158,118 B2 | 1/2007 | Liberty |
| 7,236,156 B2 | 6/2007 | Liberty |
| 7,245,218 B2 | 7/2007 | Ikehara et al. |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami et al. |
| 7,818,290 B2 | 10/2010 | Davis et al. |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,201,222 B2 | 6/2012 | Inoue |
| 8,417,960 B2 | 4/2013 | Takahashi et al. |
| 8,433,785 B2 | 4/2013 | Awadallah et al. |
| 8,449,393 B2 | 5/2013 | Sobel |
| 8,499,245 B1 | 7/2013 | Froment |
| 8,510,113 B1 | 8/2013 | Conkie et al. |
| 8,548,208 B2 | 10/2013 | Schultz |
| 8,555,077 B2 | 10/2013 | Davis |
| 8,745,729 B2 | 6/2014 | Roluri |
| 8,832,823 B2 | 6/2014 | Boss |
| 8,788,838 B1 | 7/2014 | Fadell |
| 8,803,797 B2 | 8/2014 | Scott |
| 8,819,812 B1 | 8/2014 | Weber |
| 8,838,060 B2 | 9/2014 | Walley |
| 8,941,466 B2 | 1/2015 | Bayram |
| 9,154,534 B1 | 10/2015 | Gayles et al. |
| 9,158,942 B2 * | 10/2015 | Sahita .................. G06T 1/60 |
| 9,174,123 B2 | 11/2015 | Nasiri et al. |
| 9,195,351 B1 | 11/2015 | Rosenberg |
| 9,282,112 B2 | 3/2016 | Filatov |
| 9,301,140 B1 | 3/2016 | Costigan et al. |
| 9,304,915 B2 | 4/2016 | Adams et al. |
| 9,529,987 B2 | 12/2016 | Deutschmann |
| 9,589,120 B2 | 3/2017 | Samuel |
| 2001/0004733 A1 | 6/2001 | Eldering |
| 2002/0023229 A1 | 2/2002 | Hangai |
| 2002/0089412 A1 | 7/2002 | Heger et al. |
| 2003/0033526 A1 | 2/2003 | French et al. |
| 2003/0074201 A1 | 4/2003 | Grashey et al. |
| 2003/0137494 A1 | 7/2003 | Tulbert |
| 2003/0212811 A1 | 11/2003 | Thornton |
| 2004/0015714 A1 | 1/2004 | Abraham et al. |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall et al. |
| 2004/0123156 A1 | 6/2004 | Hammond |
| 2004/0143737 A1 | 7/2004 | Teicher |
| 2004/0221171 A1 | 11/2004 | Ahmed |
| 2005/0008148 A1 | 1/2005 | Jacobson |
| 2005/0179657 A1 | 8/2005 | Russo et al. |
| 2005/0289264 A1 | 12/2005 | Illowsky et al. |
| 2006/0006803 A1 | 1/2006 | Huang et al. |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham et al. |
| 2006/0215886 A1 | 9/2006 | Black |
| 2006/0224898 A1 | 10/2006 | Ahmed |
| 2006/0282660 A1 | 12/2006 | Varghese et al. |
| 2006/0284969 A1 | 12/2006 | Kim et al. |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle et al. |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0046982 A1 | 2/2008 | Parkinson |
| 2008/0068343 A1 | 3/2008 | Hoshino |
| 2008/0084972 A1 | 4/2008 | Burke |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Akimitsu |
| 2008/0162449 A1 | 7/2008 | Chao-Yu |
| 2008/0183745 A1 | 7/2008 | Cancel et al. |
| 2008/0192005 A1 | 8/2008 | Elgoyhen |
| 2008/0200310 A1 | 8/2008 | Tagliabue |
| 2008/0211766 A1 | 9/2008 | Westerman et al. |
| 2008/0215576 A1 | 9/2008 | Zhao et al. |
| 2008/0263636 A1 | 10/2008 | Gusler |
| 2008/0298588 A1 | 12/2008 | Shakkarwar |
| 2008/0301808 A1 | 12/2008 | Calo et al. |
| 2009/0037983 A1 | 2/2009 | Chiruvolu |
| 2009/0038010 A1 | 2/2009 | Ma |
| 2009/0089879 A1 | 4/2009 | Wang et al. |
| 2009/0094311 A1 | 4/2009 | Awadallah et al. |
| 2009/0132395 A1 | 5/2009 | Lam |
| 2009/0157792 A1 | 6/2009 | Flatali |
| 2009/0189736 A1 | 7/2009 | Hayashi |
| 2009/0199296 A1 | 8/2009 | Xie et al. |
| 2009/0227232 A1 | 9/2009 | Matas |
| 2009/0241188 A1 | 9/2009 | Komura |
| 2009/0254336 A1 | 10/2009 | Dumais et al. |
| 2009/0281979 A1 | 11/2009 | Tysowski |
| 2009/0293119 A1 | 11/2009 | Jonsson |
| 2009/0320123 A1 | 12/2009 | Yu |
| 2010/0007632 A1 | 1/2010 | Yamazaki |
| 2010/0040293 A1 | 2/2010 | Hermann |
| 2010/0042403 A1 | 2/2010 | Chandrasekar et al. |
| 2010/0046806 A1 | 2/2010 | Baughman |
| 2010/0070405 A1 | 3/2010 | Joa |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0115610 A1 | 5/2010 | Tredoux |
| 2010/0122082 A1 | 5/2010 | Deng et al. |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0269165 A1 | 10/2010 | Chen |

(56) References Cited

U.S. PATENT DOCUMENTS

| | | |
|---|---|---|
| 2010/0281539 A1 | 11/2010 | Burns et al. |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten et al. |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039602 A1 | 2/2011 | McNamara |
| 2011/0043475 A1 | 2/2011 | Rigazio |
| 2011/0050394 A1* | 3/2011 | Zhang ................ G06F 3/045 340/5.82 |
| 2011/0063211 A1 | 3/2011 | Hoerl et al. |
| 2011/0065504 A1 | 3/2011 | Dugan et al. |
| 2011/0102570 A1 | 5/2011 | Wilf |
| 2011/0105859 A1 | 5/2011 | Popovic |
| 2011/0113388 A1 | 5/2011 | Eisen |
| 2011/0154273 A1 | 6/2011 | Aburada et al. |
| 2011/0159650 A1 | 6/2011 | Shiraishi |
| 2011/0159850 A1 | 6/2011 | Faith |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai et al. |
| 2011/0248941 A1 | 10/2011 | Abdo |
| 2011/0251823 A1 | 10/2011 | Davis |
| 2011/0271342 A1 | 11/2011 | Chung et al. |
| 2011/0276414 A1 | 11/2011 | Subbarao et al. |
| 2011/0304531 A1 | 12/2011 | Brooks |
| 2011/0320822 A1 | 12/2011 | Lind |
| 2012/0005483 A1 | 1/2012 | Patvarczki et al. |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0159599 A1 | 6/2012 | Szoke |
| 2012/0164978 A1 | 6/2012 | Conti |
| 2012/0167170 A1 | 6/2012 | Shi |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber et al. |
| 2012/0246737 A1 | 9/2012 | Paxton |
| 2012/0252410 A1 | 10/2012 | Williams |
| 2012/0278804 A1 | 11/2012 | Narayanasamy et al. |
| 2012/0284380 A1 | 11/2012 | Anderson |
| 2013/0024239 A1 | 1/2013 | Baker |
| 2013/0036416 A1 | 2/2013 | Raju et al. |
| 2013/0076650 A1 | 3/2013 | Vik |
| 2013/0088434 A1 | 4/2013 | Masuda |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar et al. |
| 2013/0212674 A1 | 8/2013 | Boger |
| 2013/0239195 A1 | 9/2013 | Turgeman |
| 2013/0239206 A1 | 9/2013 | Draluk |
| 2013/0263280 A1* | 10/2013 | Cote .................. G06F 21/62 726/26 |
| 2013/0282637 A1 | 10/2013 | Costigan |
| 2013/0305357 A1 | 11/2013 | Ayyagari et al. |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Bamhoefer et al. |
| 2014/0082369 A1 | 3/2014 | Waclawsky et al. |
| 2014/0111451 A1 | 4/2014 | Park |
| 2014/0118520 A1 | 5/2014 | Slaby |
| 2014/0143304 A1 | 5/2014 | Hegarty |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0283059 A1 | 9/2014 | Sambamurthy et al. |
| 2014/0317734 A1 | 10/2014 | Valencia et al. |
| 2014/0337786 A1 | 11/2014 | Luo |
| 2014/0344927 A1 | 11/2014 | Turgeman et al. |
| 2015/0002479 A1 | 1/2015 | Kawamura |
| 2015/0012920 A1 | 1/2015 | De Santis et al. |
| 2015/0062078 A1 | 3/2015 | Christman |
| 2015/0091858 A1 | 4/2015 | Rosenberg |
| 2015/0101031 A1 | 4/2015 | Harjanto et al. |
| 2015/0146945 A1 | 5/2015 | Plan |
| 2015/0170150 A1* | 6/2015 | Birdi .................. G06F 21/14 705/39 |
| 2015/0213244 A1 | 7/2015 | Lymberopoulos |
| 2015/0268768 A1 | 9/2015 | Woodhull |
| 2016/0006800 A1 | 1/2016 | Summers et al. |
| 2016/0034673 A1 | 2/2016 | Chandra |
| 2016/0042164 A1 | 2/2016 | Goldsmith et al. |
| 2016/0077620 A1 | 3/2016 | Choi |
| 2016/0164905 A1 | 6/2016 | Pinney Wood et al. |
| 2016/0164906 A1 | 6/2016 | Pinney Wood et al. |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0209948 A1 | 7/2016 | Tulbert |
| 2016/0226865 A1 | 8/2016 | Chen |
| 2016/0342826 A1 | 11/2016 | Apostolos |
| 2016/0364138 A1 | 12/2016 | Lou |
| 2017/0034210 A1 | 2/2017 | Talmor |
| 2017/0048272 A1 | 2/2017 | Yamamura et al. |
| 2017/0085388 A1* | 3/2017 | Fort .................. H04L 9/3247 |
| 2017/0090418 A1 | 3/2017 | Tsang |
| 2017/0149958 A1 | 5/2017 | Xian |
| 2017/0193526 A1 | 7/2017 | Turgeman |
| 2017/0195354 A1 | 7/2017 | Kesin |
| 2017/0230181 A1* | 8/2017 | Pogorelik ............. G06T 1/005 |
| 2017/0364919 A1 | 12/2017 | Ranganath |
| 2018/0012227 A1 | 1/2018 | Tunnell |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |

FOREIGN PATENT DOCUMENTS

| | | |
|---|---|---|
| EP | 2610776 | 7/2013 |
| ES | 2338092 | 5/2010 |
| WO | 2007146437 | 12/2007 |
| WO | 2012073233 | 6/2012 |

OTHER PUBLICATIONS

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

(56) References Cited

OTHER PUBLICATIONS

Written Opinion of the International Search Authority for PCT/IB2017/055995, dated Feb. 15, 2018.
Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication Via Multi-Modal Fusion", Thesis, 2013, Air Force Insitute of Technology.
Stinson et al., "Characterizing Bots' Remote Control Behavior". Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.
Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.
Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.
Zheng et al., "An Efficient User Verification System via Mouse Movements", Oct. 17-21, 2011, CCS' 11, Chicago, Illinois.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Spafford et al., "Software Forensics: Can We Track Code to its Authors?", Feb. 1992, Computer Science Technical Report, Purdue e-Pubs, Report No. CSD-TR-92-010.
Garfinkel and Rosenblum, "A virtual Machine Introspection-Based Architecture for Intrusion Detection.", 2003, Proc. Network and Distributed Systems Security Symp., The Internet Society, pp. 191-206.
Nance et al., "Virtual Machine Introspection", IEEE Security & Privacy, 2008.
Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.
International Search Report for application PCT/IL2011/000907 dated Apr. 19, 2012.
International Search Report for application PCT/IB2014/062293 dated Oct. 1, 2014.
International Search Report for application PCT/IB2014/062941 dated Dec. 17, 2014.
International Search Report for application PCT/IB2016/054064 dated Nov. 21, 2016.

\* cited by examiner

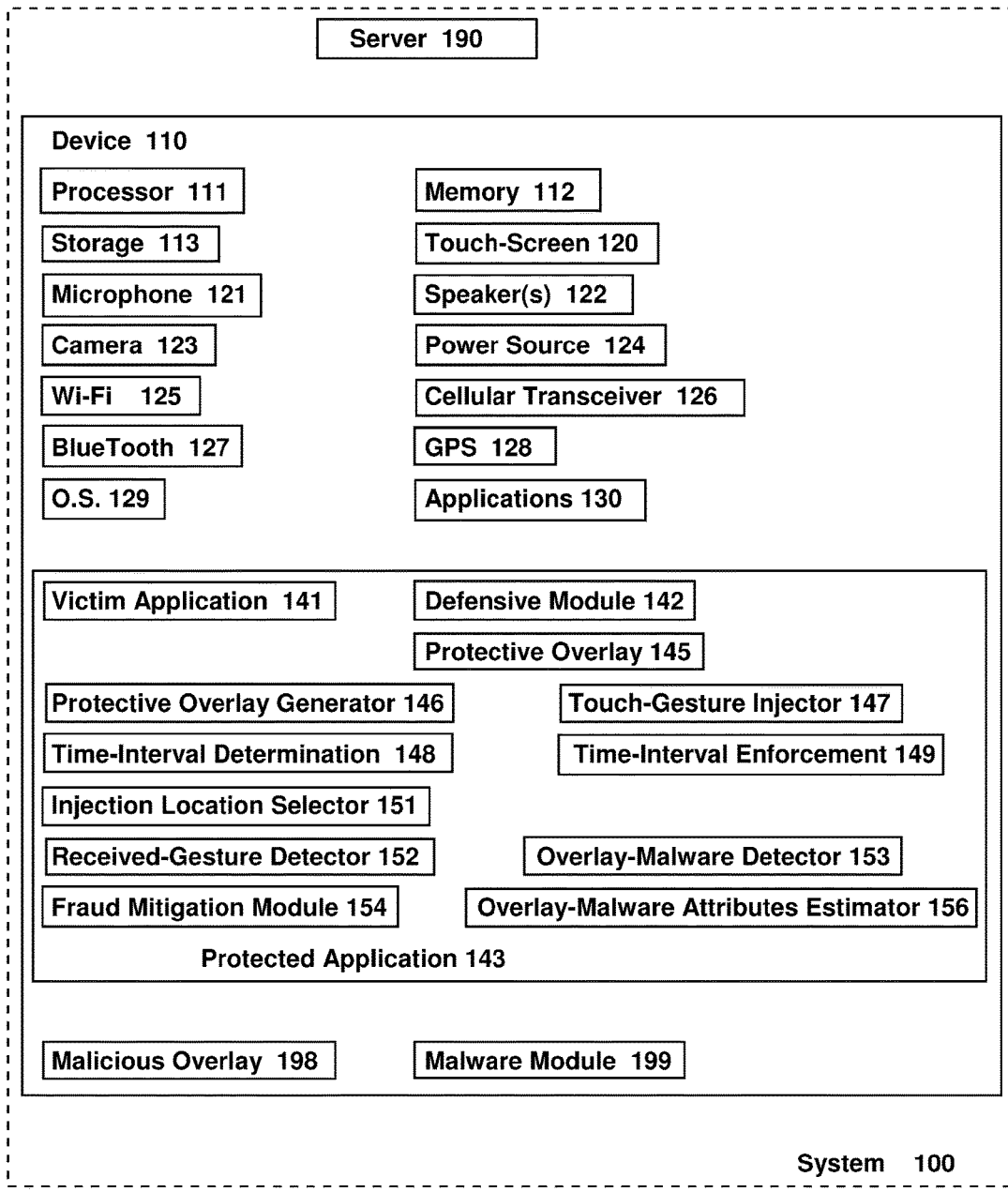

DEVICE, SYSTEM, AND METHOD OF DETECTING OVERLAY MALWARE

FIELD OF THE INVENTION

The present invention relates to the field of security of electronic devices.

BACKGROUND

Millions of people worldwide utilize various electronic devices, for example, smartphones, tablets, laptop computers, gaming devices, or the like. Some electronic devices are equipped with a touch-screen, which operates as a combined output unit and input unit: it displays text and graphics as output, and it senses touch gestures of the human user as input.

Electronic devices are utilized on a daily basis for various purposes; for example, to read or consume online content, to send and receive electronic mail (email) messages, to engage in a video conference, to engage in Instant Messaging (IM), to play games, to browse the World Wide Web, to engage with a dedicated "app" or mobile application of a particular service provider, and/or for other purposes.

SUMMARY

The present invention may include, for example, devices, systems, and methods to detect malware, particularly a malware that operates as or that utilizes a masking layer or fake layer or an overlay component (e.g., top-most layer or window or tab or interface, or always-on-top layer or window or tab or interface) on an electronic device having a touch-screen; particularly for the purpose of replacing a log-in User Interface (UI) of an application, with a fake, illegitimate, always-on-top log-in UI as part of a "phishing" attack in order to steal user credentials.

In some embodiments, a defensive module of a protected application creates its own invisible or transparent top-most layer or always-on-top layer, and artificially injects onto it periodic touch-events or tap-events or other touch-based gestures, which are simulated or emulated or introduced by the defensive module (e.g., without the need for the user to actually tap or touch any on-screen location). The defensive module then immediately checks, whether the injected touch-screen event was sensed or registered. If the recently-injected touch-event or tap-event is not detected as actually sensed or as actually received, then the defensive module determines that a malware that replaces or hijacks the top-most layer is active and operational.

The present invention may provide other and/or additional benefits or advantages.

BRIEF DESCRIPTION OF THE DRAWINGS

FIG. 1 is a schematic illustration of a system, in accordance with some demonstrative embodiments of the present invention.

DETAILED DESCRIPTION OF THE INVENTION

The term "electronic device" as used here may comprise, for example, a smartphone, a tablet, a gaming device, a laptop computer, a notebook computer, an electronic device having a touch-screen or a multi-touch screen, an Internet-of-Things (IoT) device, a wireless-connected device, an Internet-connected device, an Augmented Reality (AR) device, a Virtual Reality (VR) device, a wearable device, a smart-watch, an electronic fitness accessory, or the like.

The terms "malware" or "malware module" as used herein may comprise, for example, any suitable malware module or malware module or malware component, computerized virus, computerized Trojan, software-based malware, hardware-based malware, illegitimate code, illegal code, attack code, cyber-attack code, code or code-portion or module or unit which operates to illegitimately and/or illegally and/or secretly and/or fraudulently attack or harm a legitimate (naïve, rightful) user of an electronic device or that intends to steal data or steal assets from such legitimate user or that attempts to damage the electronic device or that attempts to otherwise abuse the electronic device for illegal purposes and/or illegitimate purposes and/or criminal purposes and/or fraudulent purposes.

The terms "Victim Application" or "Victim App", as used here, may comprise any "app" or application or mobile application or mobile-friendly application, which is targeted by a malware; and such Victim Application may be, for example, a native app or native application (e.g., downloaded from an "app store" or from a "play store" or other repository of downloadable applications), or may be implemented as a mobile-friendly version of a web-site or a web-page (e.g., utilizing HTML5 and/or JavaScript and/or CSS).

The terms "Protected Application" or "Protected App", as used herein, may refer to a Victim Application that is configured, augmented, or otherwise modified, in accordance with the present invention, to become resilient against malware, or to become secure or more secure than a non-modified Victim Application, or to become protected against a malware module, particularly against an overlay malware module as described herein.

The present invention comprises devices, systems, and methods for detecting, preventing and/or mitigating a particular type of attacks against electronic devices, and particularly devices having a touch-screen.

The Applicants have realized that a touch-screen device is exposed to an attack or a security risk which may be referred to as an "overlay attack". For example, the Android operating system (OS) enables a developer to create an Always-On-Top element or component or layer or overlay, which may mask or hide one or more other applications that may be running on the device. The Applicants have realized that in this type of attack, the genuine (legitimate, real) human user is attempting to engage with a target service (e.g., a website or a "mobile app" of a banking service or a retailer), for example by launching a mobile "app" of the service or by browsing to a URL or web-page of the service. An Attacker may utilize a virus or malware, for example, installed or residing on the end-user device, in order to create an additional "overlay" layer or element or app, which is defined or configured by the attacker to be always-on-top and thus hide or mask the real (the true) application or web-page underneath it. The attack layer that is displayed on the screen, always-on-top, may contain User Interface elements that resemble the true log-in page or the true log-in interface of the real service, for example, by displaying in the overlay layer a false or fake interface that shows the name or logo of the real website (e.g., bank or retailer), as well as username/password fields and a "submit" (or "login") button that resemble those of the real website. Accordingly, the legitimate user of the touch-screen device, instead of engaging with the real web-page or the real "app" of the service, is engaging with the attack module that displays the attack layer always-on-top; and the legitimate user is thus tricked or defrauded into entering his credentials into the attack module, which in turn abuses or steals the credentials; for example, the attach module collects the credentials that were entered by the legitimate user into the fake interface of the always-on-top overlay, and sends the credentials via a wireless link to a remote server or a remote device or a remote email address that is controlled by the attacker.

The Applicants have further realized that such an attack may be performed by an attacker, for example, by carrying out the following attack steps. (1) A malware module is installed on the electronic device, for example, by tricking the legitimate user into downloading the malware as an "app" or application, or by providing the malware module as an internal part or integral part of an otherwise useful app or application (e.g., a "Flashlight" mobile app). (2) The malware module creates a background service, which monitors and tracks the launching of other applications on that device, and which is pre-configured by the attacker to spring into action once a particular application or web-page is launched or accessed (e.g., once the Citibank (RTM) app is launched), or once an application that is on a list of several applications is launched (e.g., a banking application from a list of several banking applications); such detected application, which is the target of the attack, is referred to as the "Victim Application". (3) Upon detection by the background service of the malware module, that the Victim Application is launched and/or is accessed, the malware module creates or generate a UI component or a set of UI elements, particularly an Overlay masking layer (or window, or tab, or other UI element) or an always-on-top layer (or window, or tab, or other UI element) or a TYPE SYSTEM OVERLAY element or layer, which covers the entire screen of the device (or, which covers at least the UI of the Victim Application), and which contains a "phishing", fake, illegitimate, log-in page (e.g., a username field, a password field, a Submit or Login button). (4) The legitimate user, who has just launched the Victim Application, sees the always-on-top layer which looks like the genuine log-in page of the Victim Application, although it is actually the "phishing" interface of the always-on-top malware layer, and is thus tricked or defrauded into entering his credentials. (5) The malware module collects the entered credentials that the user entered; and sends them to a remote server or a remote device or a remote email address that is controlled by the attacker. (6) Optionally, the malware module may report back to the legitimate user that "login has failed", and may invite the user to close all applications and to try logging-in again.

The Applicants have developed a system that prevents, detects, stops and/or mitigates the above-described type of attacks. In accordance with the present invention, for example, the Victim Application is modified or is augmented or is configured by a Defensive Module, whose purpose is to prevent, detect, stop and/or mitigate such attacks. The defensive module may be an integral part or internal part of the Victim Application (e.g., downloaded and installed together with the Victim Application as an integral part thereof); or, the defensive module may be an add-on or plug-in or extension to the Victim Application (e.g., particularly if the Victim Application is a web browser or other application that may have extensions or plug-ins or add-ons); or the defensive module may be a stand-alone application or "app" which may monitor interactions and/or events on the electronic device, not necessarily integrated within the Victim Application. In accordance with the present invention, a conventional Victim Application (that is typically exposed to be compromised by an Overlay Malware) which is modified or augmented or assisted by a Defensive Module, becomes (and may be referred to as) a Protected App or a Protected Application.

Reference is made to FIG. 1, which is a schematic block-diagram illustration of a system 100, in accordance with some demonstrative embodiments of the present invention. System 100 may be or may comprise an electronic device 110, which may be able to communicate over wireless and/or wired communication links with a remote server 190; for example, over the Internet, over TCP/IP link(s) or network(s), over cellular communication link(s) or network(s), over Wi-Fi or Wi-Max or other wireless communication networks, or the like.

Device 110 may comprise, for example, a processor 111 able to execute code and programs and able to process data; a memory unit 112 able to store data (e.g., RAM memory, Flash memory, or the like); a storage unit 113 able to store data (e.g., an SD memory card); a touch-screen 120 able to display output (e.g., text, graphics, images, photographs, video) and able to receive user input (e.g., on-screen tap or double-tap, on-screen touch, on-screen force-sensitive touch or force-touch, on-screen multi-touch with two or more fingers or with a palm of the hand, on-screen pinching or widening gesture to zoom-in or to zoom-out, or the like); a microphone 121 to capture audio; one or more speaker(s) 122 to output audio; a camera 123 to capture photographs and/or video; a power source 124 (e.g., rechargeable battery) to provide power to other components of the device; a Wi-Fi transceiver (802.11 transceiver) 125; an optional cellular transceiver 126; an optional BlueTooth transceiver 127; a Global Positioning System (GPS) unit or module 128; an Operating System (OS) 129 (e.g., Android, iOS, Windows); one or more applications 130 (or "apps"); and/or other suitable components, hardware units and/or software units.

As demonstrated, a Victim Application 141 may reside in device 110; for example, a banking application that was installed by a legitimate user of the device, or a retailer application that was installed by the legitimate user of the device or that came pre-installed on the device 100 when it was purchased by the user. Furthermore, a Malware Module 199 may exist or may reside in device 110, often without the knowledge or awareness of the legitimate user or owner of the device 110. The Malware Module 199 operates by creating a Malicious Overlay 198 (or fraud overlay, or attack overlay, or illegitimate overlay, or "phishing" overlay, or credentials-stealing overlay, or masking overlay), which hides or covers or masks or replaces some or all of the User Interface (or content) that is produced by the Victim Application 141, typically with a fake "phishing" UI whose purpose is to steal user credentials.

In accordance with the present invention, a Defensive Module 142 may reside in device 110 and/or may operate within device 110; for example, as a stand-alone module or unit, or as a unit separate from the Victim Application 141, or as a module that is integrated with the Victim Application 141 such that the combination of the Defensive Module 142 with the original Victim Application 141 is regarded as a Protected Application 143.

The Defensive Module 142 operates concurrently with, and in parallel to, the regular operation of the Victim Application 141. The Defensive Module 142 creates or generates or introduces (e.g., by utilizing a Protective Overlay Generator 146) a Protective Overlay 145 or other element or overlay or layer or protective layer, which is defined as a top-most or an always-on-top layer or element, and which is transparent or invisible or hidden and has no visible content and has no visible UI elements.

The Defensive Module 142 then operates to generate or inject (e.g., by utilizing a Touch-Gesture Injector 147) a Tap Event or a touch-event or other suitable touch-screen gesture; by generating and/or executing one or more commands, or code, which emulates or simulates or generates a pre-defined touch-gestures (e.g., a tap) at a pre-defined on-screen location or coordinates.

The touch-gesture or tap events are injected at pre-defined time intervals; for example, every K milliseconds, wherein K may be for example 100 or 500 or 800; or every N milliseconds, wherein N is a pseudo-random number in the range of 200 to 700, selected pseudo-randomly again and again. A time-interval determination unit 148 may be responsible for determining and/or selecting and/or modifying the time interval between such injections; and a time-interval enforcement unit 149 may be responsible for enforcing or applying the currently-selected time interval between such injections, optionally utilizing a real-time clock or a counter to measure the elapsing of time.

The injection or the introducing of the periodic Tap Event, may be performed by utilizing a suitable command, such as by using the InputManager module or command on Android OS, which generates the Tap Event at a particular set of on-screen coordinates or at a particular on-screen location. For example, the size of the touch-screen may be 600 by 900 pixels; and the Tap Event is periodically performed by the Defensive Module at the on-screen location of X=54 and Y=37, wherein the particular on-screen location is of course known to the Defensive Module which generates the periodic Tap Event. The particular on-screen location or the particular on-screen set-of-coordinates, at which the tap event or touch-gesture event is injected or introduced or is emulated or is simulated or is generated, may be determined by an Injection Location Selector 151, which may select or determine such on-screen location based on a pre-defined lookup table or list (e.g., listing sets of on-screen coordinates to be utilized in a consecutive order), or based on a random or pseudo-random selection (e.g., pseudo-randomly selecting an X coordinate and a Y coordinate for the location of the tap event), or based on a pre-defined pattern (e.g., firstly emulating a tap at the center of the screen; then emulating taps in various corners of the screen; then emulating taps in centers of lines that connect the center of the screen with the corners of the screen; or the like).

It is clarified that the human user is not aware of those periodic Tap Events, which are entirely automatic and are entirely machine-generated by a set of commands or instructions executed by the processor and/or touch-screen of the end-user device, and the human user is not required to actually tap periodically and/or manually, and the human user is not required or requested to manually perform any particular on-screen operation or gesture by the Defensive Module. The tap events (or other emulated touch-gesture events) are not visible to the user and are not conveyed to the user in any manner, and they do not cause the electronic device to vibrate or to make an audible sound or to otherwise let the user know of their occurrence.

Immediately upon (and/or continuously in parallel to) performing the periodic Tap Event by the Defensive Module, the Defensive Module also checks whether a Tap was indeed received or sensed by the touch-screen of the device, by utilizing a Received-Gesture Detector 152. Particularly, the Defensive Module checks whether the periodic Tap Event, that was performed by the InputManager module at a particular pre-defined on-screen location (such as (54, 37) in the above example, was indeed registered as a received Tap Event at that particular on-screen location and at the time in which the Tap Event was injected; and not before the tap event; or, not more than M milliseconds after the injection, to compensate for minor system processing delays, wherein M is for example, 1 or 5 or 10 milliseconds; wherein M, for example, is not more than 1 percent or 5 percent or 10 percent of the periodic interval K or N between Tap Events). The permissible delay between the time-point of generating the tap event, and the time-point of sensing or detecting it, may be pre-defined or pre-configured, or may be modified dynamically or may be selected based on operational parameters of the particular device 110 (e.g., taking into accounts its processor speed, RAM memory capacity, or the like).

If the Defensive Module injects the Tap Event at the particular on-screen location, but the Defensive Module does not concurrently or immediately (e.g., within M milliseconds) also senses or receives the Tap Event as an incoming input event, then the Defensive Module determines that the transparent Defensive Module's layer, which is intended and supposed to be the top-most/always-on-top layer, is not actually the top-most/always-on-top layer; namely, that another layer or module that is running on the device, must be running as the top-most/always-on-top layer, and must be receiving the periodically-injected Tap Event that the Defensive Module injects periodically. Accordingly, in such case, the Defensive Module determines that an attack module or a malware is most-probably hijacking or replacing the top-most layer, or that an attack module or malware is injecting a "phishing" always-on-top layer or top-most layer. The detection may be performed by an Overlay-Malware Detector 153, which may be part of the Defensive Module 142.

Upon such detection, the Defensive Module may trigger a Fraud Mitigation Module 154 to perform one or more other operations to stop or mitigate fraud or attacks; for example, to generate a pop-up window or an audio recording that alerts the user that its device is under attack by a malware and that the user should not enter his credentials, and/or the Fraud Mitigation Module may send an immediate signal or message to a remote server of the service (e.g., the server of the banking institution or the retailer) to indicate that this particular account should be immediately and automatically blocked or locked until the legitimate user contacts a fraud department by phone, or the like. For demonstrative purposes, Fraud Mitigation Module 154 is shown as a local unit within device 110; however, Fraud Mitigation Module 154 may alternatively be located externally to device 110, or in remote server 190; or the functions of Fraud Mitigation Module 154 may be divided or distributed across the local device 110 and the remote server 190.

In contrast, if the Defensive Module indeed senses that the Tap Event that was injected, is timely received and sensed as an incoming Tap Event (e.g., within M milliseconds of the tap event being generated), then the Defensive Module determines that its own always-on-top hidden layer is indeed still the top-most layer on the device, thereby deducing that there is currently no active attack by an overlay malware layer. Optionally, every T milliseconds or seconds, the Defensive Module may send a signal to other components of the Victim Application, and/or to a remote server, to indicate that the Defensive Module is active and operational and that no overlay attack is currently being sensed.

In some embodiments, a single injection of a single tap-event or a single touch-event, may be utilized in order to detect and/or determine that an overlay malware is active and/or operational. In other embodiments, multiple such injections may be utilized, in order to reduce or prevent "false positive" detections; for example, due to a legitimate or semi-legitimate masking window or masking UI element that may be active on the end-user device due to a non-malware application other than the Protected Application, such as a Facebook (TRM) Messenger window or tab or layer. In such embodiments, for example a series or a set of two or more such tap-events or gesture-events, as described herein, may be utilized in order to determine or estimate the size and/or ratio and/or dimensions and/or on-screen location and/or other attributes of the suspected masking layer or the suspected always-on-top layer or top-most layer, and in order to distinguish or differentiate between (i) an always-on-top malware module, and (ii) an always-on-top legitimate application other than the Victim Application (or other than the Protected Application). In some embodiments, the defensive module may distinguish or differentiate among (or may separately detect or determine) three scenarios: (I) an always-on-top malware module is active, or (II) an always-on-top legitimate or non-malware module or application (such as Messenger) is active, or (III) no always-on-top module is active except for the always-on-top layer of the defensive module of the Protected Application. The differentiation may be based on one or more estimated attributes of the always-on-top layer, deduced from a series or set of multiple injections of tap-events or touch-events, for example as described herein.

The Defensive Module is able to determine the existence or non-existence of an Overlay Malware, or is able to determine whether such Overlay Malware is currently operational (active) or non-operational (non-active). However, embodiments of the present invention may not merely detect existence and non-existence of such Overlay Malware; but rather, embodiments of the invention may further comprise an Overlay-Malware Attributes Estimator 156 operable to characterize and/or to classify such detected Overlay Malware and/or to deduce or determine its operational attributes.

For example, the on-screen location in which the Tap Event is injected periodically by the Defensive Module, may be modified by the Defensive Module between such Tap Event injections; and data collected from multiple such injections may be used to determine the size of the overlay malware layer (e.g., size of K1 by K2 on-screen pixels, for example it covers 400 by 600 pixels even though the entire screen size is 800×1200 pixels), the size ratio of such overlay malware layer (e.g., it is a rectangle having a perspective ratio of 2:3), the percentage of the size of the screen that it occupies (e.g., the overlay malware layer occupies 75 percent of the full size of the screen), the exact on-screen coordinates or location(s) of the overlay malware layer (which is invisible or transparent and cannot be seen by a human user) for example defined by four X,Y coordinates of four corners of its rectangle (for example, first corner at coordinates (50, 100); second corner at coordinates (50, 220); third corner at coordinates (130, 220); fourth corner at coordinates (130, 100), or the like); and/or which particular on-screen regions or sections or UI elements of the Victim Application are being overlayed by the Overlay Malware (e.g., a rectangular overlay malware layer that is invisibly and transparently located over the Username field and over the Password field and over the Submit button, but does not cover the logo of the banking website or the on-screen menu bar); and/or to determine whether the entirety of the on-screen UI or the entirety of the on-screen content of the Victim Application is overlayed by the malware module, or only a portion of the on-screen UI or content of the Victim Application is overlayed by the malware module. In some embodiments, such detected attributes of the malware module may be automatically sent to a remote security lab or security team, which may collect data from multiple malware incidents in order to further combat the malware module.

In some embodiments, the automatic differentiation between a malware module that masks the victim application, and a third-party non-malware application (e.g., Messenger) that partially or entirely masks the UI of the Protected Application, may be performed based on one or more criteria. For example, the defensive module may automatically capture a screenshot of the touch-screen device having the suspected masking layer; and a computer vision algorithm and/or an image recognition algorithm and/or an Optical Character Recognition (OCR) process (e.g., these may be local to the electronic device, or may reside remotely on a remote server) may be utilized to automatically determine the content of the masking layer. In an example, if the Protected Application is of a particular bank; and the screenshot of the masking layer is analyzed and is determined to show "Please log in to your Messenger account", then the defensive module determines that the overlay masking layer belongs to a non-malware third-party application, rather than to an active overlay-malware module.

In some embodiments, the defensive module may utilize a lookup table or a list of pre-defined on-screen coordinates or locations, that correspond to known UI elements of the Victim Application, in order to further characterize the detected (or the suspected) overlay-malware module, and in order to deduce which particular UI elements of the Victim Application are being masked by the overlay malware module. For example, a pre-defined lookup table of the defensive module may indicate that in the Victim Application which is a particular banking application, the bank Logo appears at on-screen coordinates (50, 30); and then the Username field appears 20 pixels below it; and then the Password field appears 45 pixels below it; and then a Submit/Login button appears 50 pixels below it and also offset to the right-side of the screen; and the defensive module may utilize a series of injections of multiple non-human touch-events or tap-events, in order to pin-point and determine which particular UI elements of the Victim Application are (or are not) masked by the overlay malware module. For example, if an injected tap event is indeed received at on-screen location (5, 10), then the defensive module determines that this particular region of the screen is not masked by a malware module; and based on the lookup table of known coordinates of known UI elements or UI components or content components of the Victim Application, the defensive module may determine that said particular on-screen-region (which is unmasked) is occupied by an "About Us" button. Similarly, the defensive module may pin-point its detections based on multiple injections of non-human touch events or tap events, and may selectively determine that, for example, only a Password field of the Victim Application is masked, whereas a Username field of the Victim Application is not masked, by said overlay malware module. Other suitable types of determinations may be automatically performed by the defensive module.

In a demonstrative embodiment, the following non-limiting example of code or pseudo-code, denoted "Code 1: Injection Code", may be utilized for periodically injecting or introducing a Tap Event or a Touch Event or other touch-gesture event:

Code 1: Injection Code

```
int touchPeriod = 5000; int delay = 0;
final float x = 500; final float y = 500;
ScheduledThreadPoolExecutor executor = new
      ScheduledThreadPoolExecutor(1);
      //create a periodical triggered thread
executor.scheduleAtFixedRate(new Runnable( ) {
    @Override
    public void run( ) {
        // schedule a periodic task at a fixed interval
        try {
            long time = java.lang.System.currentTimeMillis( );
            InputManager inputManager =
            (InputManager)getSystemService(Context.
            INPUT_SERVICE);
            // get the input manager
Method injectInputEventMethod = InputManager.class.getMethod
("injectInputEvent", InputEvent.class, Integer.TYPE);
            //extract the injection method using reflection
                MotionEvent event = MotionEvent.obtain (time, time,
                    MotionEvent.ACTION_DOWN, x, y, 0);
            // create a touch event
                event.setEdgeFlags(0xf);
            // add parameters, to recognize this event
event.setSource(InputDeviceCompat.SOURCE_TOUCHSCREEN);
                injectInputEventMethod.invoke(inputManager, event, 0);
            // fire the event
        }
        catch (Throwable e) {
            Log.e("TouchInjection", e.toString( ));
        }
    }
}, delay, touchPeriod, TimeUnit.MILLISECONDS);
```

In a demonstrative embodiment, the following non-limiting example of code or pseudo-code, denoted "Code 2: Detection Code", may be utilized for detecting or sensing or determining whether an already-injected Tap Event or Touch Event or touch-gesture event is indeed sensed or received:

Code 2: Detection Code

```
view.setOnTouchListener(new View.OnTouchListener( ) {
                // register a touch listener to any view available
    @Override
    public boolean onTouch(View v, MotionEvent event) {
        if(event.getEdgeFlags( ) == 0xf) {
            // is this the event that we triggered?
            return true;        // if so, consume it
        }
        return false;           //else, do not consume
    }
});
```

Embodiments of the present invention need not have "Root Access" to the device on which the Defensive Module operates (namely, the device on which the Victim Application is installed and running); and need not be implemented as part of an Operating System or as part of a kernel or a driver; but rather, may be implemented as a user-level application which may be downloaded and installed by a regular, legitimate, post-purchase end-user of the device without "rooting" the device. This may be in direct contrast to some conventional anti-virus or anti-malware modules, which may require Root Access to the device, or which may be installed or added to the device only by the maker of the device, or which may require a risky or illegal or illegitimate or complicated "rooting" of the device by the user Embodiments of the invention need not read or access any low-level OS log files, which are typically reserved for OS components and are typically not available to third-party user-level applications (e.g., since OS log files may contain private information of the user). Embodiments of the invention need not access or utilize a READ_LOGS command or module of the OS (or similar log-accessing commands or modules or drivers), and/or do not utilize a parameter value or a constant value such as "android.permission.READ_LOGS" (or similar system-log related parameter or constant or pointer).

Embodiments of the invention may operate particularly in devices running Android OS version 4.1 or later, in which user-level applications (e.g., any application that is not pre-defined as a System App or as part of the OS) do not have access or authorization or permission to read or to inspect OS log files.

Embodiments of the invention may detect a "phishing" overlay layer on any suitable version of Android OS; and/or on regardless of whether the device is already "rooted" or "non-rooted"; and/or regardless of having or not having access to system log files; and/or regardless of the Defensive Module or the Victim Application being a user-level application or a system-level application.

The present invention comprises devices, systems, and methods to detect malware, particularly an overlay malware that generates a fake, always-on-top, masking layer or an overlay component that attempts to steal passwords or other user credentials. For example, a defensive module protects a victim application, particularly of an electronic device having a touch-screen. The defensive module generates a transparent or invisible always-on-top layer of its own; and periodically injects automatically-generated non-human tap events or touch-gesture events, and checks whether the injected events are indeed received, in order to determine whether an overlay malware is active.

In some embodiments, a method comprises: automatically detecting that an overlay malware module is active on an electronic device having a touch-screen, wherein the overlay malware module generates a malicious always-on-top masking layer that covers at least a portion of a content displayed by a victim application running on said electronic device.

In some embodiments, the detecting comprises: (a) generating a protective always-on-top layer which is transparent and non-visible to a human user; (b) automatically generating a non-human touch-event in a particular on-screen location of said touch-screen; (c) detecting whether or not said non-human touch-event was actually received at said protective always-on-top layer within M milliseconds of performing step (b); and (d) if the detecting of step (c) indicates that said non-human touch-event was not received at said protective always-on-top layer within M milliseconds of performing step (b), then determining that said overlay malware module is active on the electronic device.

In some embodiments, step (d) further comprises: based on a series of multiple non-human injections of touch-events at multiple, different, on-screen locations, determining an estimated on-screen size of the overlay malware module.

In some embodiments, step (d) further comprises: based on a series of multiple non-human injections of touch-events at multiple, different, on-screen locations, determining an estimated on-screen location of the overlay malware module.

In some embodiments, step (d) further comprises: based on a series of multiple non-human injections of touch-events at multiple, different, on-screen locations, determining which particular User Interface (UI) elements of the victim application, are actually masked by the overlay malware module.

In some embodiments, step (d) further comprises: based on a series of multiple non-human injections of touch-events at multiple, different, on-screen locations, determining that a first particular User Interface (UI) element of the victim application is actually masked by the overlay malware module, and further determining that a second, different, UI element of the victim application is concurrently non-masked by the overlay malware module.

In some embodiments, step (d) further comprises: based on a series of multiple non-human injections of touch-events at multiple, different, on-screen locations, determining whether (I) the overlay malware module is active and covers an entirety of the touch-screen of the electronic device, or (II) the overlay malware module is active an covers less than the entirety of the touch-screen of the electronic device.

In some embodiments, step (d) comprises: based on a series of multiple non-human injections of touch-events at multiple, different, on-screen locations, detecting and distinguishing between: (I) a first scenario in which the malware module is active and is masking at least a portion of the victim application in order to steal user credentials, and (II) a second scenario in which the victim application is masked by a non-malware always-on-top layer of an application which is not said malware module and is not said victim application.

In some embodiments, step (d) comprises: based on a series of multiple non-human injections of touch-events at multiple, different, on-screen locations, detecting and distinguishing between: (I) a first scenario in which the malware module is active and is masking at least a portion of the victim application in order to steal user credentials, and (II) a second scenario in which the victim application is masked by a non-malware always-on-top layer of an application which is not said malware module and is not said victim application; and (III) a third scenario in which it is determined that no malware module and no other application is currently masking a User Interface of the victim application.

In some embodiments, step (d) comprises: determining one or more attributes of the overlay malware module, based on a series of multiple non-human injections of touch-events at multiple, different, on-screen locations, at pseudo-random time intervals that are pseudo-randomly selected from a range of permissible time-interval values.

In some embodiments, step (d) comprises: determining one or more attributes of the overlay malware module, based on a series of multiple non-human injections of touch-events at multiple, different, on-screen locations, at pseudo-random time intervals that are non-pseudo-randomly selected from a pre-defined set of permissible time-interval values.

In some embodiments, step (d) comprises: determining one or more attributes of the overlay malware module, based on a series of multiple non-human injections of touch-events at multiple, different, on-screen locations, wherein the multiple on-screen locations have a particular pre-defined sequence that indicates in which order said injections are performed in particular on-screen locations.

In some embodiments, step (d) comprises: determining one or more attributes of the overlay malware module, based on a series of multiple non-human injections of touch-events at multiple, different, on-screen locations, wherein the multiple on-screen locations have a particular pre-defined sequence that indicates in which order said injections are performed in a central region of the touch-screen and in corner regions of the touch-screen.

In some embodiments, all of steps (a), (b), (c) and (d) are performed on a non-rooted electronic device.

In some embodiments, all of steps (a), (b), (c) and (d) are performed by a defensive module that does not have root access in said electronic device.

In some embodiments, all of steps (a), (b), (c) and (d) are performed by a defensive module that does not have access to any system logs of the electronic device.

In some embodiments, all of steps (a), (b), (c) and (d) are performed by a defensive module that is implemented as an integral component within said victim application.

In some embodiments, all of steps (a), (b), (c) and (d) are performed by a defensive module that is implemented as an external component which resides in said electronic device and which runs on said electronic device but is a separate application from said victim application.

In some embodiments, if it is determined in step (d) that the overlay malware module is active on the electronic device, then the method comprises activating a local fraud mitigation module that runs locally on said electronic device.

In some embodiments, if it is determined in step (d) that the overlay malware module is active on the electronic device, then the method comprises: automatically transmitting an account-locking signal from said electronic device to a remote server, wherein the account-locking signal indicates to said remote server to block access to a particular user-account on said remote server.

In some embodiments, a system comprises: a defensive module configured to run on an electronic device having a touch-screen, wherein the defensive module automatically detects an overlay malware module that is active on said electronic device, wherein the overlay malware module generates a malicious always-on-top masking layer that covers at least a portion of a content displayed by a victim application running on said electronic device; wherein the defensive module is configured to: (a) generate a protective always-on-top layer which is transparent and non-visible to a human user; (b) automatically generate a non-human touch-event in a particular on-screen location of said touch-screen; (c) detect whether or not said non-human touch-event was actually received at said protective always-on-top layer within M milliseconds of performing step (b); and (d) if the detecting of step (c) indicates that said non-human touch-event was not received at said protective always-on-top layer within M milliseconds of performing step (b), then determine that said overlay malware module is active on the electronic device.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may operate in conjunction with, or may utilize, one or more systems, devices and/or methods that operate to detect malware and/or stop malware and/or remove malware; and/or operate to detect or stop or remove a computer virus or a "Trojan" module or a "phishing" attack or other cyber-attack or fraud; and/or operate to distinguish between a human user and a "bot" or automatic script or a malicious automatic script; and/or operate to distinguish between (I) a malicious code or malware and (II) a non-malicious code or non-malicious program; and/or operate in conjunction with a system that utilizes user-specific behavior to distinguish among human users and/or to detect automated users or "bots"; and/or operate to inject or introduce an anomaly or aberration or interference or irregularity into the UI of a website or a web-page or an application or an "app" (e.g., an irregular or abnormal or unexpected on-screen behavior or movement of a cursor or pointer in response to user's interactions with input units), and/or to monitor the user's reaction and/or corrective action(s) to such anomaly or aberration.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
    automatically detecting that an overlay malware module is active on an electronic device having a touch-screen,
    wherein the overlay malware module generates a malicious always-on-top masking layer that covers at least a portion of a content displayed by a victim application running on said electronic device;
    wherein the detecting comprises:
    (a) generating a protective always-on-top layer which is transparent and non-visible to a human user;
    (b) automatically generating a non-human touch-event in a particular on-screen location of said touch-screen;
    (c) detecting whether or not said non-human touch-event was actually received at said protective always-on-top layer within M milliseconds of performing step (b);
    (d) if the detecting of step (c) indicates that said non-human touch-event was not received at said protective always-on-top layer within M milliseconds of performing step (b), then determining that said overlay malware module is active on the electronic device.

2. The method of claim 1, wherein step (d) further comprises:
    based on a series of multiple non-human injections of touch-events at multiple, different, on-screen locations, determining an estimated on-screen size of the overlay malware module.

3. The method of claim 1, wherein step (d) further comprises:
    based on a series of multiple non-human injections of touch-events at multiple, different, on-screen locations, determining an estimated on-screen location of the overlay malware module.

4. The method of claim 1, wherein step (d) further comprises:
    based on a series of multiple non-human injections of touch-events at multiple, different, on-screen locations, determining which particular User Interface (UI) elements of the victim application, are actually masked by the overlay malware module.

5. The method of claim 1, wherein step (d) further comprises:
    based on a series of multiple non-human injections of touch-events at multiple, different, on-screen locations, determining that a first particular User Interface (UI) element of the victim application is actually masked by the overlay malware module, and further determining that a second, different, UI element of the victim application is concurrently non-masked by the overlay malware module.

6. The method of claim 1, wherein step (d) further comprises:
    based on a series of multiple non-human injections of touch-events at multiple, different, on-screen locations, determining whether (I) the overlay malware module is active and covers an entirety of the touch-screen of the electronic device, or (II) the overlay malware module is active and covers less than the entirety of the touch-screen of the electronic device.

7. The method of claim 1, wherein step (d) comprises:
    based on a series of multiple non-human injections of touch-events at multiple, different, on-screen locations, detecting and distinguishing between: (I) a first scenario in which the malware module is active and is masking at least a portion of the victim application in order to steal user credentials, and (II) a second scenario in which the victim application is masked by a non-malware always-on-top layer of an application which is not said malware module and is not said victim application.

8. The method of claim 1, wherein step (d) comprises:
    based on a series of multiple non-human injections of touch-events at multiple, different, on-screen locations, detecting and distinguishing between: (I) a first scenario in which the malware module is active and is masking at least a portion of the victim application in order to steal user credentials, and (II) a second scenario in which the victim application is masked by a non-malware always-on-top layer of an application which is not said malware module and is not said victim application; and (III) a third scenario in which it is determined that no malware module and no other application is currently masking a User Interface of the victim application.

9. The method of claim 1, wherein step (d) comprises:
    determining one or more attributes of the overlay malware module, based on a series of multiple non-human injections of touch-events at multiple, different, on-screen locations, at pseudo-random time intervals that are pseudo-randomly selected from a range of permissible time-interval values.

10. The method of claim 1, wherein step (d) comprises:
    determining one or more attributes of the overlay malware module, based on a series of multiple non-human injections of touch-events at multiple, different, on-screen locations, at pseudo-random time intervals that are non-pseudo-randomly selected from a pre-defined set of permissible time-interval values.

11. The method of claim 1, wherein step (d) comprises:
    determining one or more attributes of the overlay malware module, based on a series of multiple non-human injections of touch-events at multiple, different, on-screen locations, wherein the multiple on-screen locations have a particular pre-defined sequence that indicates in which order said injections are performed in particular on-screen locations.

12. The method of claim 1, wherein step (d) comprises:
    determining one or more attributes of the overlay malware module, based on a series of multiple non-human injections of touch-events at multiple, different, on-screen locations, wherein the multiple on-screen locations have a particular pre-defined sequence that indicates in which order said injections are performed in a central region of the touch-screen and in corner regions of the touch-screen.

13. The method of claim 1, wherein all of steps (a), (b), (c) and (d) are performed on a non-rooted electronic device.

14. The method of claim 1, wherein all of steps (a), (b), (c) and (d) are performed by a defensive module that does not have root access in said electronic device.

15. The method of claim 1, wherein all of steps (a), (b), (c) and (d) are performed by a defensive module that does not have access to any system logs of the electronic device.

16. The method of claim 1, wherein all of steps (a), (b), (c) and (d) are performed by a defensive module that is implemented as an integral component within said victim application.

17. The method of claim 1, wherein all of steps (a), (b), (c) and (d) are performed by a defensive module that is implemented as an external component which resides in said electronic device and which runs on said electronic device but is a separate application from said victim application.

18. The method of claim 1, wherein if it is determined in step (d) that the overlay malware module is active on the electronic device, then the method comprises activating a local fraud mitigation module that runs locally on said electronic device.

19. The method of claim 1, wherein if it is determined in step (d) that the overlay malware module is active on the electronic device, then the method comprises automatically transmitting an account-locking signal from said electronic device to a remote server, wherein the account-locking signal indicates to said remote server to block access to a particular user-account on said remote server.

20. A system comprising:
a defensive module configured to run on an electronic device having a touch-screen,
wherein the defensive module automatically detects an overlay malware module that is active on said electronic device,
wherein the overlay malware module generates a malicious always-on-top masking layer that covers at least a portion of a content displayed by a victim application running on said electronic device;
wherein the defensive module is configured to: (a) generate a protective always-on-top layer which is transparent and non-visible to a human user; (b) automatically generate a non-human touch-event in a particular on-screen location of said touch-screen; (c) detect whether or not said non-human touch-event was actually received at said protective always-on-top layer within M milliseconds of performing step (b); and (d) if the detecting of step (c) indicates that said non-human touch-event was not received at said protective always-on-top layer within M milliseconds of performing step (b), then determine that said overlay malware module is active on the electronic device.

* * * * *